May 1, 1945.   S. GILBERT   2,374,990
ENGINE STARTING MECHANISM
Filed March 9, 1942
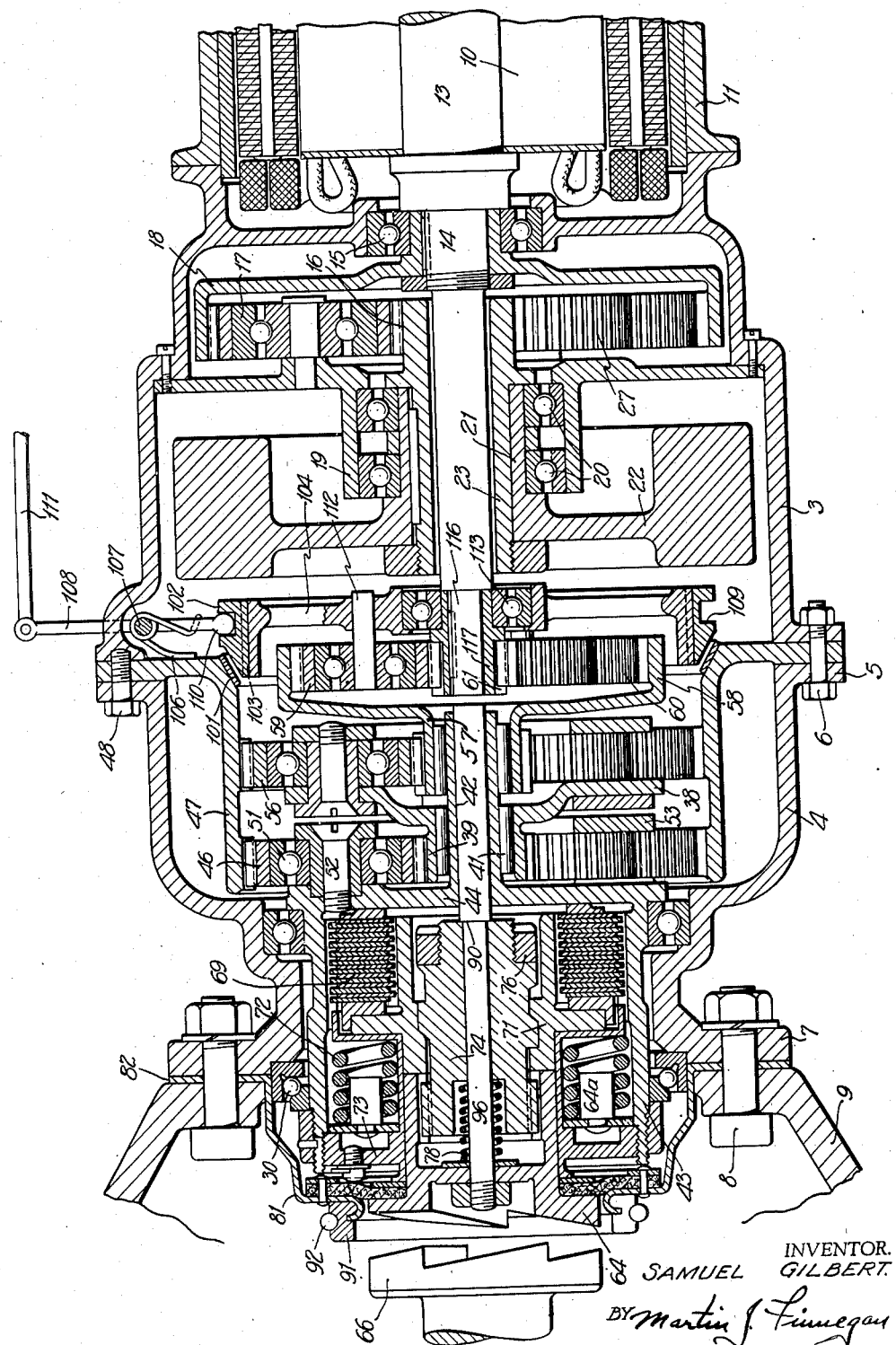
INVENTOR.
SAMUEL GILBERT.
BY Martin J. Finnegan
ATTORNEY.

Patented May 1, 1945

2,374,990

UNITED STATES PATENT OFFICE 2,374,990

ENGINE STARTING MECHANISM

Samuel Gilbert, Verona, N. J., assignor to Bendix Aviation Corporation, South Bend, Ind., a corporation of Delaware Application March 9, 1942, Serial No. 433,995

2 Claims. (Cl. 123—179)

This invention relates to engine starting mechanism and more particularly to a starting mechanism of the inertia type, in which there is a period of energy storage in an "inertia" element (flywheel, for example) prior to any rotation of the member of the engine to which initial rotary movement is to be imparted.

Objects of the present invention are to make advantageous use of all the energy of the flywheel all the way down to zero flywheel speed; and to minimize the shock of engagement. The latter I propose to bring about by engaging the starter and engine jaws at zero rotary speed, then accelerating the flywheel (the jaws remaining engaged but not rotating); and thereafter, beginning the rotation of the starter jaw.

Still another object is to produce a direct cranking action by use of energy from a prime mover additional to the flywheel, said prime mover being operative, first, to accelerate the flywheel, and subsequently—and without reversal in its direction of rotation—being instrumental in helping the flywheel to speed up the engine and continue to transfer energy thereto even after the flywheel has come to a complete stop, and so long as is necessary to insure effective starting.

These and other objects of the invention will become apparent from inspection of the following specification when read with reference to the accompanying drawing, wherein is illustrated the preferred embodiment of the invention. It is to be expressly understood, however, that the drawing is for the purpose of illustration only, and is not designed as a definition of the limits of the invention, reference being had to the appended claims for this purpose.

The invention is illustrated in the accompanying drawing as embodied in a housing having an outer section 3 and an inner section 4 with a suitable flange 5 to receive bolts 6 for detachably connecting said sections. The inner section 4 is provided with a second flange 7 to receive bolts 8 for securing the starter to the crankcase of an engine, a portion of the latter being indicated at 9. Secured to section 3 is an electric motor 10 provided with a casing 11 having a flange to register with a corresponding flange on casing section 3, and be supported thereby.

The motor may be of any suitable type embodying an armature shaft 13 provided with a projecting, reduced portion 14 that is rotatably mounted as by means of a suitable bearing 15 in a transversely extending wall of housing section 3. Drivably connected to the reduced portion of the armature shaft is an annular gear 18 that meshes with planet pinions 17 driving a central pinion 16. Adjacent the member 18 is a cylindrical boss 19 forming part of a transverse wall secured to housing section 3. The boss 19 supports therein a double bearing 20 within which rotates the hub 21 of the flywheel 22, also the shaft 23 to which said hub 21 is keyed as indicated. At its end the shaft 23 is formed into the pinion 16, constituting the "sun," or central element of the planetary system whose several planet pinions, as at 17 and 27, mesh with the orbital gear 18 heretofore referred to.

A second planetary system includes a planet carrier 38 integral with a sun gear 39, and is rotatably mounted as by means of a bearing 41 on a stub shaft 42 that extends outwardly from, and is drivably connected to, a barrel 43 having a closed end 44, the stub shaft being integral with said closed end in the illustrated embodiment of the invention. Ball bearings 30 carried by the inner housing section 4 are preferably employed for rotatably mounting the barrel 43.

Gear 39 meshes with a plurality of planetary gears 46 that are rotatably mounted on the barrel end 44 and mesh with an annulus gear 47 which is fixedly mounted within the housing by means of studs 48. Preferably three planetary gears 46 are employed, and one of these is shown in section in Fig. 1. These gears 31 are preferably spaced 120° apart, so that as the view is taken in Fig. 1, one of the gears appears in elevation just below the stub shaft 42. Each of the planetary gears 46 (and the same is true of planets 17, 27) is rotatably mounted by means of a ball bearing, as at 51, carried by a sleeve which is countersunk at its inner end in barrel end 44. A screw 52 supports each sleeve, bearing and planetary gear. If desired, a retaining ring 53 for the bearings 51 may be provided, as an integral part of the screw receiving sleeves.

As shown, annulus 47 has two orbital tracks, the second being engaged by planet pinions 56 rotatably mounted (by parts similar to those supporting pinions 51) to turn with carrier 38 above described, and each meshing with a sun gear 57 formed on one end of an annular gear 58. Central pinion 61 and planets 59, 60 coact with gear 58 in a manner to be described.

The electric motor 10 is adapted to drive an engine engaging member 64 through the train of reduction gearing described above. The member 64 constitutes one element of a jaw clutch, the other element being formed by a member 66, carried by a rotating part of the engine to be cranked, such as the engine crankshaft or an extension thereof. There is also preferably employed the usual multiple disk clutch embodying a plurality of friction disks 69, a number of said disks being splined to the inner surface of barrel 43, and the remainder being splined to the outer surface of an interiorly threaded nut 71. Resilient means such as a plurality of coil springs 72 and an adjusting nut 73, which is threaded into the inner end of barrel 43, are provided for varying the pressure with which disks 69 are maintained in engagement.

Mounted for rotary and longitudinal movement within nut 71 is the usual threaded shaft 74 which is longitudinally splined at its inner end to drivably engage a correspondingly splined, tubular and outwardly extending portion 64a of the jaw clutch member 64. Movement of threaded shaft 74 to the left, as viewed in Fig. 1, relative to nut 71 is positively limited by means of a member 76 threaded on the outer end of shaft 74 and constituting a stop for engagement with a shoulder formed interiorly of nut 71. Preferably a coil spring 78 is interposed between jaw clutch member 64 and shaft 74, a portion of said spring extending into a recess formed in the inner end of the shaft, to yieldingly resist relative movement of the parts.

The starter is preferably provided with the usual oil sealing means for preventing oil in the engine crankcase 9 from seeping into the starter housing. This includes a cup-shaped member 81 that is preferably formed of metal and is provided with a flange 82 on the outer end thereof, said flange being adapted to be clamped between flange 7 of the starter housing and the engine crankcase. The inner portion of member 81 is bent inwardly toward jaw member 64, and is provided with a central opening which is slightly larger in diameter than the outer diameter of the head of jaw member 64.

In order to prevent seepage of oil through the central opening in member 81, the latter preferably carries the usual washer of leather or the like, secured in any suitable manner to the shoulder provided adjacent the bend of member 81. Normally the inner portion of the washer is held in engagement with the adjacent surface of the head of jaw member 64 by means of a sleeve which slidably surrounds the cylindrical portion 64a of the jaw clutch member and abuts at its outer end against a flange provided on nut 71. The outer periphery of the head of member 81 is provided with longitudinally disposed slots adapted to receive radial lugs which project inwardly from the inner surface of a split-ring 91 that is supported on the curved lip of the oil seal member 81. The several portions of the split-ring 91 are preferably retained in position on member 81 by means of a surrounding resilient member, such as a coil spring 92, which rests in a circular groove formed in the outer periphery of said ring 91. The latter is adapted to rotate on the curved lip surrounding the central opening in member 81; this construction being more fully illustrated in Patent No. 1,962,397, granted to Raymond P. Lansing on June 12, 1934.

There is also preferably provided the usual rod 96 which slidably extends through stub shaft 42, barrel end 44, threaded shaft 74 and a central opening in the hub of member 81. The inner portion of rod 96 is of reduced diameter to provide a shoulder 90 which normally abuts against the outer end of shaft 74. The inner end of rod 96 is threaded to receive a nut which abuts the hub of jaw member 64 and coacts with shoulder 90 to retain said member and shaft in operative relationship.

A "brake shoe" or friction ring 101 is suitably secured to an oblique surface of orbital track 47, and is engageable by a correspondingly shaped surface on a brake element 102 when the latter is shifted along the splines 103 on the periphery of planet carrier 104. A spring 106 has one end abutting the flange of track 47, and its central portion winds around a pin 107; the opposite end of the spring being so formed as to operatively engage the shifter arm 108. Brake 102 has a peripheral groove 109 to receive the yoke portion 110 of the shifter arm 108, and a link 111 pivotally receives the outer end of arm 108. Link 111 may be actuated by a solenoid, or manually, or by any other suitable means. Pins 112 support the planets 59, 60 for unitary rotation with their carrier 104, and the latter is rotatively supported on the outer race of bearing 113. Bearing 113 surrounds the reduced end 116 of shaft 13—14, and a sleeve 117 (on which central pinion 61 is formed) is keyed to said reduced end 116.

In operation, motor 10 is energized, whereupon shaft 14 causes gears 18, 17, 27, 16 and 61 to rotate. Rotation of gear 16 produces corresponding rotation of flywheel 22. Rotation of the sun gear causes rotation of the planet gears 59 and 60 about their axes with the result that the orbital gear 58 is rotated. The rotation of the orbital gear being occasioned by the coaction between the inertia of the pinions 59 and 60, brake element 102 and the sudden rotation and high rate of acceleration of the armature shaft 13 in response to motor energization. When the orbital gear is thus rotated, the friction and inertia of the second gear train, the clutch mechanism and the screw shaft 74 are overcome with the result that the shaft 74 is axially shifted thereby causing the jaw 64 to engage the engine jaw 66. Immediately upon such engagement, the entire gear train—that is, from gear 58 to the screw shaft 74—comes to a standstill, for the turning effort is, as yet, insufficient to overcome the static inertia of the engine to which the jaw is attached. This stoppage of gear 58, however, does not interfere with continued rotation of shaft 14, due to the planetary nature of the connection from "sun" gear 61 to orbital gear 58. Hence shaft 14 continues to operate to accelerate the flywheel 22, by way of gears 18, 17, 27 and 16, and in response to the continuing flow of current to motor 10.

When the operator is satisfied that flywheel 22 has been brought to full acceleration, so that the storage of energy is sufficient to assure initial rotation of engine member 66, he actuates link 111 to throw brake element 102 into engagement with the stationary friction band 101, whereupon planet carrier 104 is brought to rest, and a reaction is produced upon orbital gear 58 to rotate said orbital gear—the "sun" gear 61 being now in rotation at high speed—and thus is set in motion the entire gear train extending from orbital gear 58 to the engaged jaws 64 and 66. In this manner the engine is "turned over," and the energy previously stored in flywheel is thus transferred to the engine.

During this energy transfer the motor 10 may continue to receive current (from any suitable source, as in common practice) and such continuing operation of the motor provides additional cranking energy, which additional cranking energy may continue to be supplied for as long a period as is desirable to assure against any loss of cranking momentum. Of course, as soon as the engine fuel combustion becomes regular, the jaw 66 will accelerate beyond the cranking speed of jaw 64, whereupon the shaft 74 will be reverse-threaded back to the jaw-retracting position, as in all screw-engaged starter drives. Upon this occurrence there is, of course, no need for further energization of motor 10, and therefore the operator will open the circuit thereto. At the same time the operator will release the link 111, allowing spring 106 to return brake element 102 to the non-braking position illustrated.

What is claimed is:

1. In an engine starter, a motor, a flywheel, an engine-engaging member, means responsive to rotation of the motor to move said engine-engaging member to engine-engaging position, said means including a planetary gear train having an orbital element which is brought to a stop by said engine-engaging member when said engine-engaging member reaches engine-engaging position, and also including a planet carrier which continues to rotate with said motor, means for drivably connecting said motor and flywheel, and means for stopping the rotation of said planet carrier and thereby causing the rotation of said motor and flywheel to be communicated to said engine-engaging member, by way of said orbital element.

2. In an engine starter, a motor, an engine-engaging member, means responsive to rotation of the motor to move said engine-engaging member to engine-engaging position, said means including a planetary gear train having an orbital element which is brought to a stop by said engine-engaging member when said engine-engaging member reaches engine-engaging position, and also including a planet carrier which continues to rotate with said motor, and means for stopping the rotation of said planet carrier and thereby causing the rotation of said motor to be communicated to said engine-engaging member, by way of said orbital element.

SAMUEL GILBERT.